O. SCHUMANN, Jr.
CLUTCH SHIFTER FOR AUTOMOBILES AND OTHER VEHICLES.
APPLICATION FILED MAR. 7, 1917.
1,273,543.
Patented July 23, 1918.
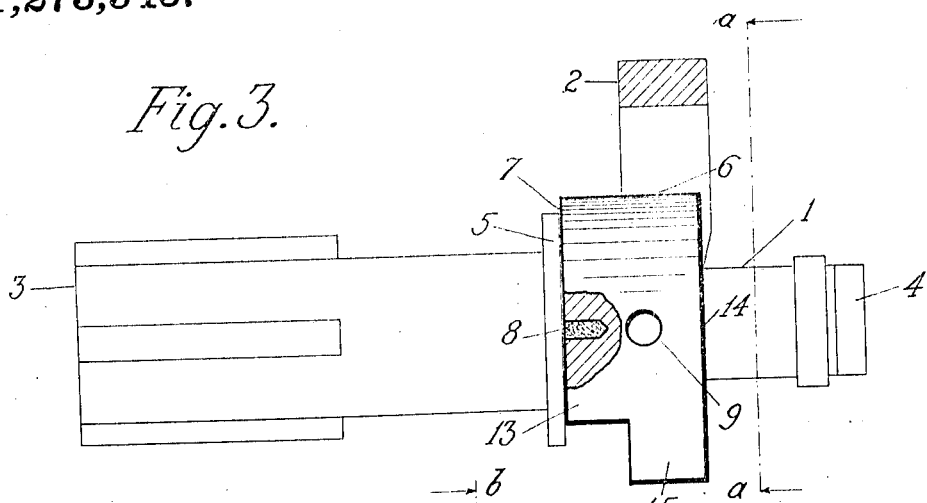
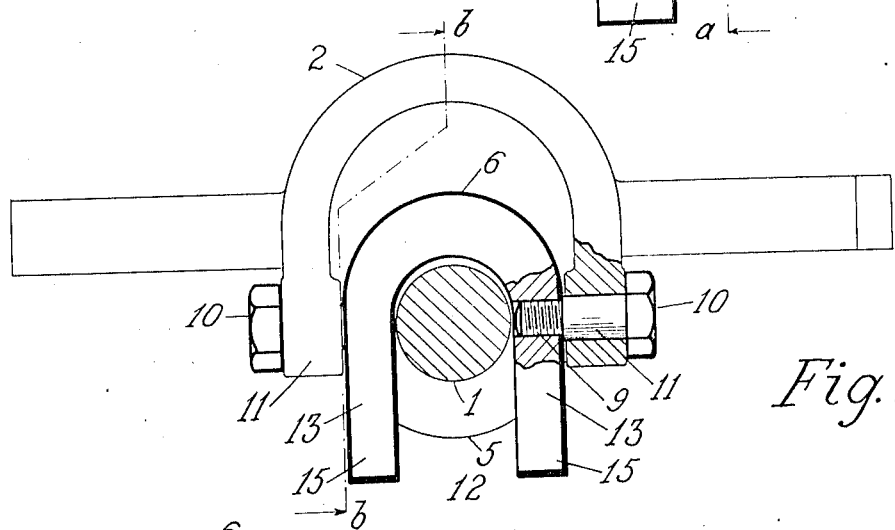
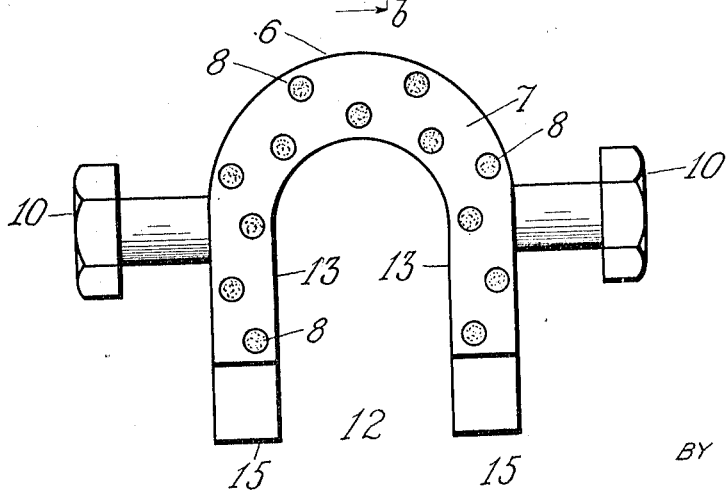
INVENTOR.
Otto Schumann Jr.
BY C. S. Goldberg
ATTORNEY.

UNITED STATES PATENT OFFICE.

OTTO SCHUMANN, JR., OF PORTLAND, OREGON, ASSIGNOR TO OTTO SCHUMANN, OF PORTLAND, OREGON.

CLUTCH-SHIFTER FOR AUTOMOBILES AND OTHER VEHICLES.

1,273,543.

Specification of Letters Patent.   Patented July 23, 1918.

Application filed March 7, 1917.  Serial No. 153,177.

*To all whom it may concern:*

Be it known that I, OTTO SCHUMANN, Jr., a citizen of the United States, residing at Portland, in the county of Multnomah and State of Oregon, have invented a new and useful Clutch-Shifter for Automobiles and other Vehicles, of which the following is a specification.

My invention relates to improvements in automobiles and other vehicles, where a clutch is employed to connect the engine with the rest of the driving mechanism; and the objects of my invention are to eliminate the friction rollers, which are at present employed to separate the male from the female part of the cone-clutch, thereby simultaneously eliminating the grease-cups incidental to these friction rollers; further, eliminating the disagreeable noise invariably attending even a slight wear on the friction-rollers; providing a simpler mechanism for shifting the clutch; and finally to use the clutch-shifter as a brake thus obviating the necessity of a separate brake on the rim of the cone-clutch.

I attain these objects by the mechanism illustrated in the accompanying drawing, in which—

Figure 1 is an end view of my machine as seen from the rear of the vehicle; Fig. 2, a front view along section *a—a* in Fig. 3, illustrating the manner of attaching my machine to the yoke and the relative position on the drive shaft; Fig. 3, a section along the line *b—b* in Fig. 2 showing my machine in side view.

Similar numerals refer to similar parts throughout the several views.

To illustrate the application of my invention, the same is shown here in combination with the spacer-shaft 1 and the clutch-roller yoke 2 common to all clutch driven cars.

Shaft 1 connects in the customary manner at end 3 with the universal coupling not shown in the drawing; end 4 is bolted to the male part of the cone-clutch, also left out in this drawing. Flange 5 provides the path on which the friction rollers travel when the yoke 2 is operated to shift the spacer-shaft 1 in axial direction and to disengage the clutch. In place of these friction rollers I employ a horse-shoe shaped clutch-shifter 6, preferably composed of phosphor-bronze, which straddles the spacer-shaft 1 and presses with its surface 7 against the flange 5 whenever the pedal operated yoke 2 is manipulated to disengage the clutch. When the clutch is to be engaged the surface 7 must, of course, be withdrawn from contact with flange 5.

To prevent excessive wear the surface 7 is dotted with an appropriate number of graphite-filled holes 8, a sectional view of one of the latter appearing in Fig. 3.

Screwed into the clutch-shifter 6 at the points 9 are screws 10 resting pivotally in the bearings 11 of yoke 2; by means of this pivotal support a uniform contact between surface 7 and flange 5 is positively insured.

The friction developed between these two last named surfaces has been found large enough to brake the revolutions of the spacer-shaft, and thus to make unnecessary the customary brake applied to the rim of the cone-clutch itself. If it is desired to increase the wearing surface 7 of my shifter, the open space 12 below shaft 1 and between the two legs 13 may be filled out with a suitable insert, the shifter thus forming a complete collar around the shaft 1. The construction as shown in the drawing, however, has the advantage of simplicity, and therefore is preferred.

To provide sufficient wearing metal along surface 7, in a shifter as narrow in width as possible, hole 9 in Fig. 3 is located closer to edge 14. The point of support thus being outside the shifter's center line of gravity, there would be an undesirable deviation of surface 7 from the perpendicular. The preponderance of metal at points 15 furnishes the counterweight to overcome this tendency.

Having thus described my invention, it will be seen, that my objects have been attained and, although I have shown the preferred form of my invention, I reserve to myself the right to make such minor changes in detail of construction as will not contravene the spirit thereof.

I claim:

A clutch-shifter of horse-shoe shape, having on its wearing surface a plurality of indentations for the receipt of lubricating material, having disposed, on the outside of the parallel members, opposite each other and with their axis parallel to said wearing surface, suitable supporting pivots to keep the shifter suspended with its arched portion uppermost, having at the ends of the vertical members, opposite to the wearing surface, a preponderance of metal designed to maintain the wearing surface in an essentially vertical position, substantially as set forth.

OTTO SCHUMANN, Jr.